Jan. 13, 1942.  E. G. RANKIN  2,270,010
SHEAR CONSTRUCTION
Filed Nov. 7, 1939
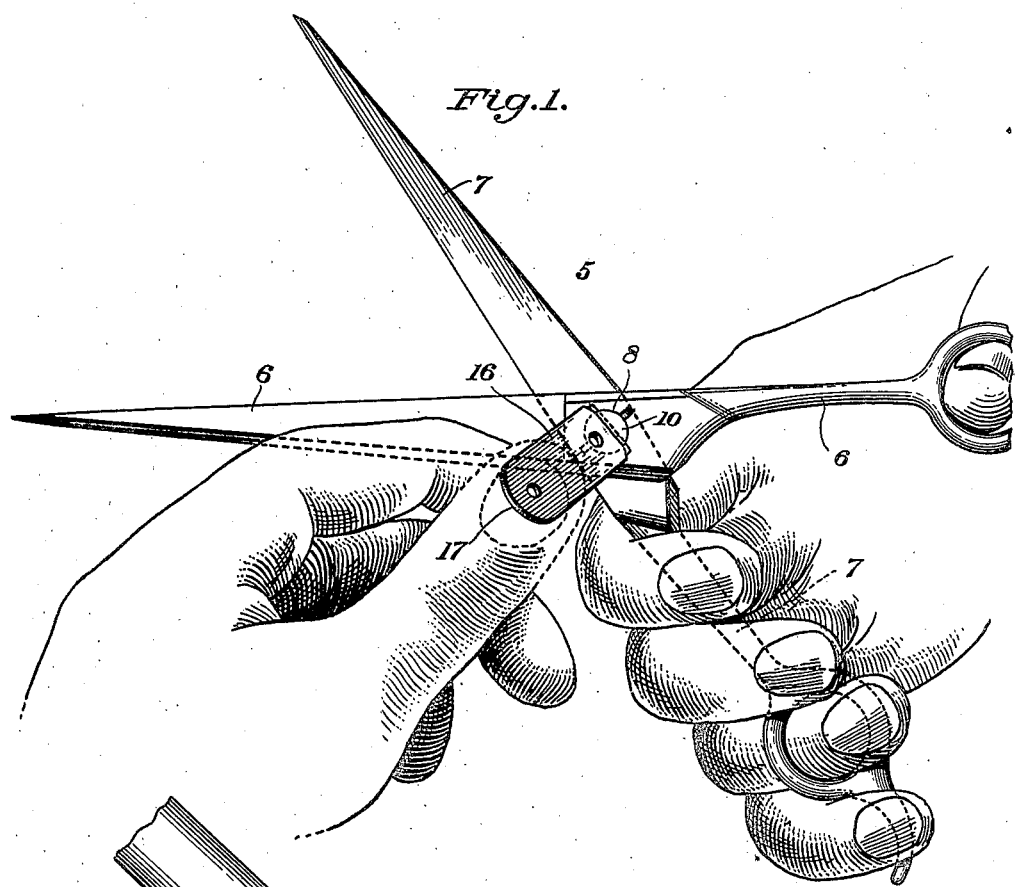
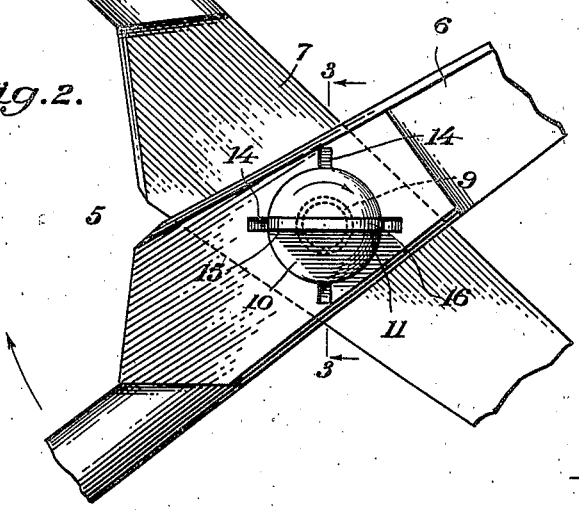
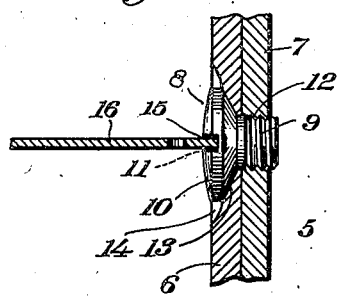
Edward G. Rankin,
INVENTOR
BY Victor J. Evans & Co.
ATTORNEYS Patented Jan. 13, 1942

2,270,010

UNITED STATES PATENT OFFICE 2,270,010

SHEAR CONSTRUCTION

Edward G. Rankin, Dorrance, Kans.

Application November 7, 1939, Serial No. 303,295

3 Claims. (Cl. 30—266)

My invention relates to a shear construction and more particularly to the means employed for pivotally connecting the blades or shears together.

One of the principal objects of my invention is to provide a shear construction equipped with a pivot means for not only connecting the blades together but so constructed and arranged as to reliably adjust the blades relative to each other.

Another object of my invention is to provide a shear construction of the above described character which is extremely simple in construction, reliable in use, efficient in operation and economical in manufacture.

Other objects and advantages will be apparent from the following description, appended claims and annexed drawing.

Referring to the drawing wherein like reference characters designate like parts throughout the several views:

Figure 1 is a top plan view of a pair of shears illustrating my invention as applied thereto.

Figure 2 is a fragmentary enlarged top plan view of the shears illustrating my invention.

Figure 3 is a sectional view taken on the line 3—3 of Figure 2.

In practicing my invention I employ a pair of shears 5 of ordinary construction equipped with a pair of cutting blades 6 and 7. The blades are pivotally connected together by a pivot member or screw 8 fashioned with a screw threaded shank 9 and a head 10, said head being formed with a tool kerf 11 extending thereacross. The blade 7 is provided with a threaded aperture 12 which receives the threaded shank 9 and thereby secures said blade fast to said screw. The blade 6 is formed with an aperture 13 fashioned to receive the screw and head thereof in a manner whereby the outer or top face of said head is flush with the outer face of the blade and which coacts with said screw to permit said blade to rotate or move relative to said screw. The blade 6 is fashioned with a plurality of grooves 14 radially extending away from said head 10.

The grooves are arranged in pairs whereby diametrically opposite grooves are adapted to align with said kerf to form a tool slot 15 which receives therein the end of a tool 16 in a manner whereby the end of the tool is seated within the pair of aligned grooves 14 and the kerf 11. When the tool 16 is thus inserted in the tool slot 15 and the blades moved relative to each other said tool serves to loosen or tighten the shank 9 within the blade 7 as the case may be, thereby effecting adjustment between the blades 6 and 7.

The tool 16 is of an elongated configuration and fashioned with an arcuate end 17 whereby the same may be inserted in relatively small tool slots formed by the kerf of a screw and the pair of grooves in the blade adjacent the screw.

From the foregoing it will be apparent that, by equipping the blade in which the head end of a screw is seated with radially extending grooves adapted for registry with the kerf in the screw, I have provided a simple, efficient and reliable means whereby the tension between the cutting blades may be readily adjustable.

What I claim is:

1. A device of the character described, comprising, a pair of cutting blades; a screw pivotally connecting said blades together and fashioned with a kerf, one of said blades being fast to said screw and the other of said blades fitted to move relative to said screw and fashioned with a plurality of grooves extending from said screw, a pair of said grooves adapted for alignment with said kerf to form a tool slot whereby to receive a tool for adjusting said screw upon relative movement of said blades.

2. A device of the character described, comprising, a pair of cutting blades, a pivot member connecting said blades together and fashioned with a kerf, one of said blades threadedly secured to said member and the other of said blades fitted for movement relative to said member and fashioned with a pair of grooves extending from said kerf, in combination with a tool fitted within said kerf and said grooves for moving said member upon relative movement of said blade.

3. In a shear construction, a pair of cutting blades, a screw pivotally connecting said blades together and fashioned with a head having a kerf, one of said blades being fast to said screw and the other of said blades fitted to rotate about said screw and fashioned with a plurality of grooves radially extending from said head, and a pair of said grooves adapted for alignment with said kerf to form a tool slot whereby to receive a tool for adjusting said screw upon relative movement of said blades.

EDWARD G. RANKIN.